US005545848A

United States Patent [19]

Lin

[11] Patent Number: 5,545,848

[45] Date of Patent: Aug. 13, 1996

[54] CASSETTE SPLITTER FOR TELEVISION ANTENNA SIGNALS

[76] Inventor: Hsin-Yi Lin, P.O. Box 55-1670, Taipei (104), Taiwan

[21] Appl. No.: 140,433

[22] Filed: Oct. 25, 1993

[51] Int. Cl.$^{6}$ .................. H02G 3/08

[52] U.S. Cl. .................. 174/52.1; 361/759; 439/282

[58] Field of Search .................. 174/52.1, 59, 60, 174/61, 62, 63, 64, 65 R; 361/752, 796, 801, 825, 827, 759; 439/278, 282

[56] References Cited

U.S. PATENT DOCUMENTS

| | | | |
|---|---|---|---|
| 3,641,464 | 2/1972 | Crowhurst et al. | 174/35 R X |
| 4,567,318 | 1/1986 | Shu | 174/356 G C |
| 4,851,609 | 7/1989 | Reddy | 174/35 R |
| 5,182,696 | 1/1993 | Her | 174/35 R X |

*Primary Examiner*—Kristine L. Kincaid
*Assistant Examiner*—Christopher Horgan

[57] ABSTRACT

A cassette TV splitter includes a housing having a F-connector secured in a front cavity recessed in a front panel of the housing and having a pair of latch members on two opposite side walls of the housing, an electrical circuit board built in the housing for obtaining a matching impedance for effectively transmitting radio or television signals through a TV antenna, and a rear cover shielding a rear socket of the housing having a pair of latch holes respectively notched in two opposite side walls of the rear cover, whereby upon snapping engagement of the two latch members on the housing with two latch holes in the rear cover, the housing will be quickly combined with the rear cover for holding the electrical circuit board therein and both input and output cables for transmitting the signals may be directly grounded on a grounding metal plate provided in the splitter.

11 Claims, 5 Drawing Sheets

CASSETTE SPLITTER FOR TELEVISION ANTENNA SIGNALS

BACKGROUND OF THE INVENTION

A conventional television (TV) jack such as 2-way splitter mounted on a wall includes an input terminal, an output terminal, and a F-connector secured to a mounting plate or a housing, which requires some mechanical joining jobs such as fixation by screws, rivets, welding or soldering, causing a very inconvenient installation whenever arranging an antenna system, and also causing increased rejection rate and assembly cost in a factory production.

It is therefore desired to disclose a television antenna splitter of which the elements in construction of the splitter may be easily, quickly assembled ready for communication service.

SUMMARY OF THE INVENTION

The object of the present invention is to provide a cassette TV splitter including a housing having a F-connector secured in a front cavity recessed in a front panel of the housing and having a pair of latch members on two opposite side walls of the housing, an electrical circuit board built in the housing for obtaining a matching impedance for effectively transmitting radio or television signals through a TV antenna, and a rear cover shielding a rear socket of the housing having a pair of latch holes respectively notched in two opposite side walls of the rear cover, whereby upon snapping engagement of the two latch members on the housing with two latch holes in the rear cover, the housing will be quickly combined with the rear cover for holding the electrical circuit board therein and both input and output cables for transmitting the signals may be directly grounded on a grounding metal plate provided in the splitter.

DETAILED DESCRIPTION

Figure 1:
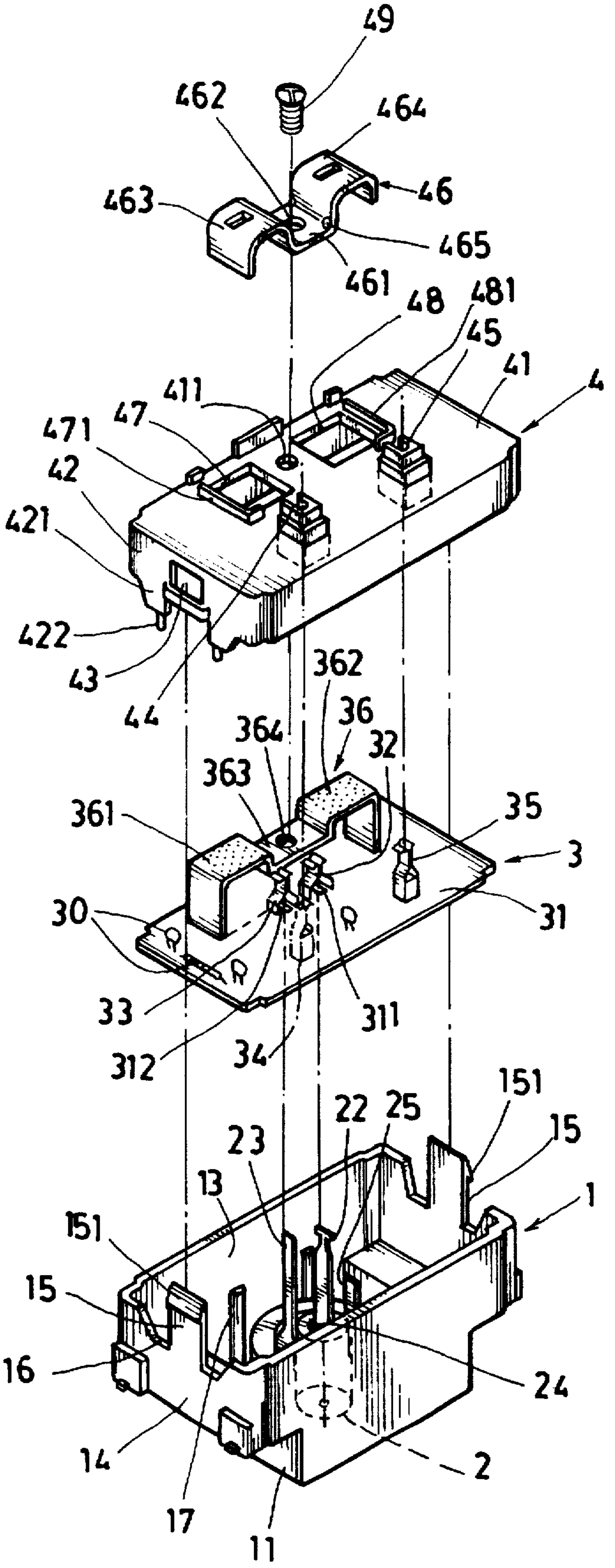
FIG. 1 is an exploded view showing all elements in construction of the present invention.
Figure 2:
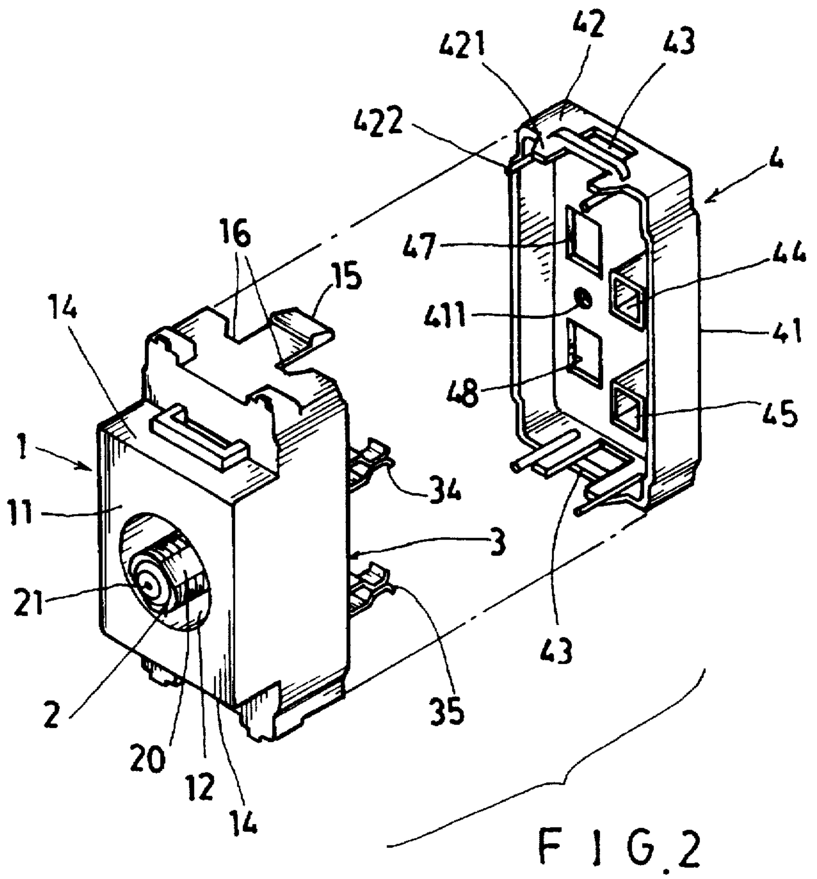
FIG. 2 is a perspective view when combining the housing and the rear cover in accordance with the present invention.
Figure 3:
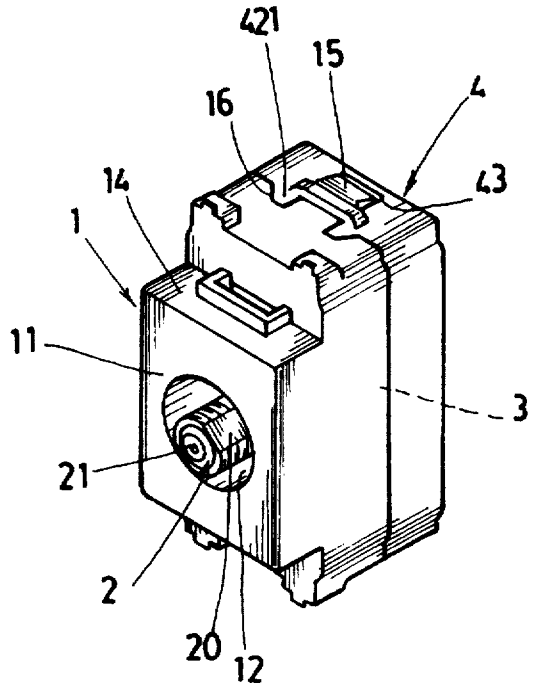
FIG. 3 shows an assembled splitter of the present invention.

As shown in the drawing figures, the present invention comprises: a housing 1, a F-connector 2, an electrical circuit board 3, and a rear cover 4 for mounting an input terminal 5 and an output terminal 6 each terminal 5 or 6 secured with a coaxial cable thereon.

The housing 1 includes: a front panel 11 having a front cavity 12 recessed rearwardly in the front panel 11 for mounting the F-connector 2 in the front cavity 12, a rear socket 13 recessed in a rear portion of the housing 1 for mounting the electrical circuit board 3 in the rear socket 13 of the housing 1, and a pair of latch members 15 disposed on two opposite side walls 14 of the housing 1 with each latch member 15 formed with a ratchet tooth 151 on a rear end portion of the latch member 15 having a pair of recesses 16 disposed on two opposite side portions of each latch member 15 and recessed in each side wall 14.

The F connector 2 includes: a female socket 21 formed in a front central portion of a threaded stem 20 of the F connector for engaging a male F connector (not shown) for transmitting television signals from an outside antenna to an interior television set (not shown), a central conductor pin 22 protruding rearwardly from the threaded stem 20 and electrically conducted with the female socket 21 through a central pin slot 311 formed through a substrate plate 31 of the electrical circuit board 3 mounted in the rear socket 13 of the housing, a grounding pin 23 protruding rearwardly from the threaded stem 20 juxtapositional to the central conductor pin 22 and electrically insulative from the central conductor pin 22 by an insulative medium 24 embedded in a central portion of the F connector 2, a positioning pin 25 secured with the grounding pin 23 and protruding rearwardly from the threaded stem 20 to have a rear end portion 251 retaining the substrate plate 31 of the electrical circuit board 3, and a nut 26 locking the threaded stem 20 of the F connector 2 in the front cavity 12 of the housing 1.

The electrical circuit board 3 includes: an impedance matching circuit 30 printed or fixed on the substrate plate 31 secured in the housing 1, a central conductor clip 32 secured on a central portion of the substrate plate 31 aligned with the first pin slot 311 for clamping the central conductor pin 22 of the F connector 2, a grounding pin clip 33 secured on the substrate plate 31 juxtapositional to the central conductor clip 32 for clamping the grounding pin 23 of the F connector 2 with the grounding pin 23 passing through a second pin slot 312 formed through the substrate plate 31, an input conductor clip 34 and an output conductor clip 35 respectively secured on the substrate plate 31 adjacent to the central conductor clip 32 and the grounding pin clip 33, and a grounding anvil member 36 secured on the substrate plate 31 and made of electrically conductive metal to be grounded in cooperation with a grounding clamp member 46 of a rear cover 4 combinably secured with the housing 1 for sealing the electrical circuit board 3 in the housing 1 and the cover 4.

The grounding anvil member 36 is generally M shaped and includes: a first convex base portion 361 secured to the substrate plate 31 electrically connected with the grounding pin clip 33, a second convex base portion 362 secured to the substrate plate 31 and connected to the first base portion 361 by a central bridge portion 363 having an inner screw hole 364 formed in the bridge portion 363 to be engaged with a screw 49 passing through an outer screw hole 462 formed in the grounding clamp member 46 secured to the rear cover 4 for electrically grounding purpose.

Figure 4:
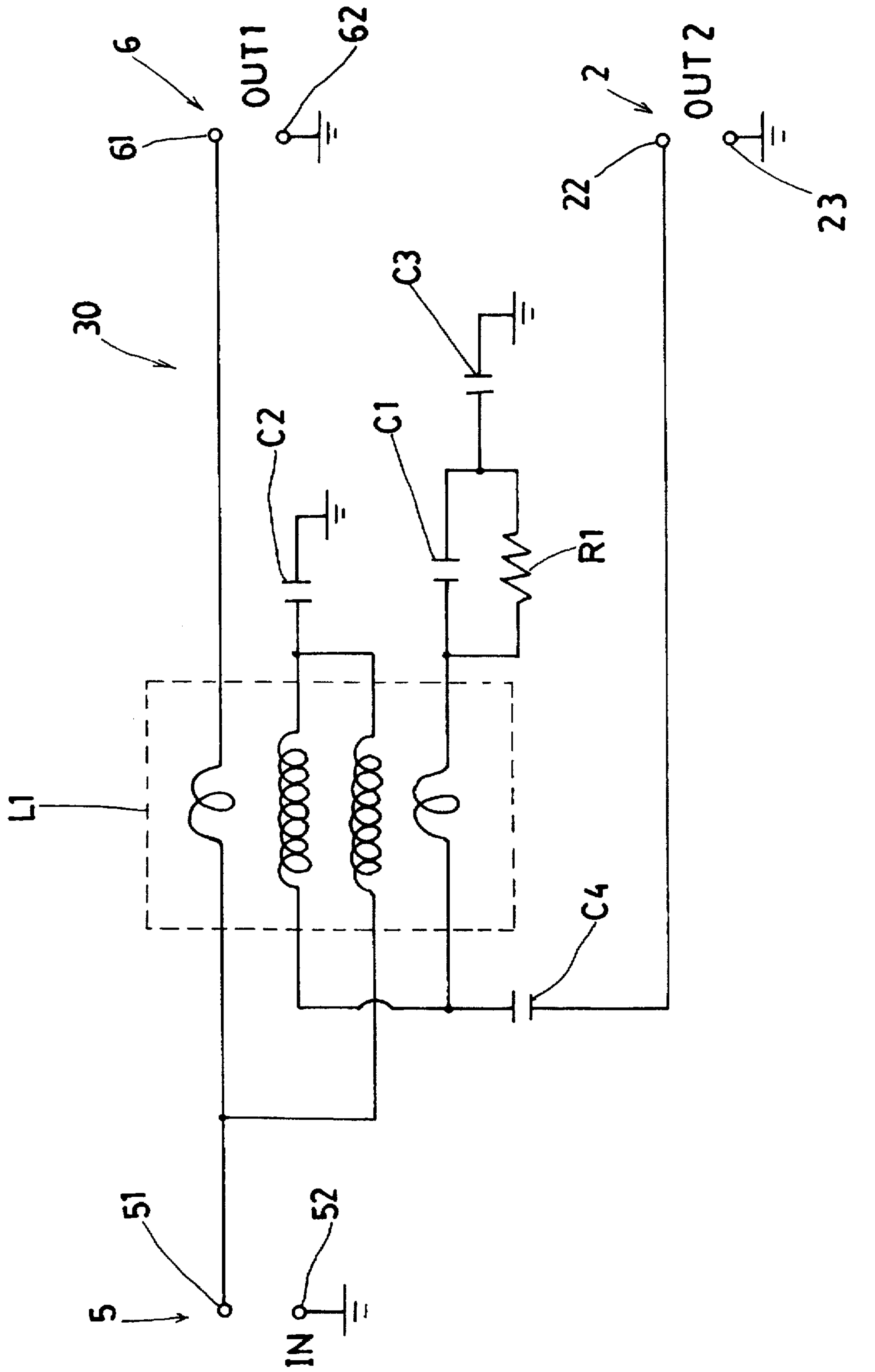
FIG. 4 is an electrical circuit provided in this invention.

The rear cover 4 includes: a cover plate 41 having two opposite side walls 42 perpendicularly connected to the cover plate 41, each said side wall 42 provided with a latch hole 43 engageable with a ratchet tooth 151 of a latch member 15 formed on each side wall 14 of the housing 1 for combining the rear cover 4 with the housing 1, an input and an output terminal socket 44, 45 respectively formed through the rear cover 4 for respectively connecting an input and an output terminal 5, 6 for transmitting television antenna signals inwardly and outwardly through the input and output terminal 5 and 6, and a first and a second grounding opening 47, 48 respectively formed through the cover plate 41 of the rear cover 4 for respectively protruding the first and the second convex base portions 361, 362 of the grounding anvil member 36 rearwardly through the two grounding openings 47, 48 for clamping two grounding layers 52, 62 of the input and the output terminals 5, 6 for grounding use as clamped by a grounding clamp member 46, each terminal 5 or 6 having a central conductor 51 or 61 and each terminal secured with a coaxial cable. The two central conductors 51, 61 are respectively inserted in the input and the output terminal sockets 44, 45 in the cover 4 to allow the input terminal 5 to be electrically connected with the F connector 2 at position OUT 2 and connected with the output terminal 6 at position OUT 1 through the impedance matching circuit 30 as shown in FIG. 4. Each side wall 42 is formed with two protrusions 421 to be engaged with the two recesses 16 formed in each side wall 14 of the housing 1.

The impedance-matching circuit 30 includes: a balancing coil L1 connected between the input terminal 5 and the output terminal 6 and the F connector 2, a matching capacitor C1 and a matching resistor R1 parallelly connected between the input terminal 5 and the F connector 2 for obtaining a desired matching impedance of television antenna signals, and three insulating capacitors C2, C3, C4 connected between the input terminal 5 and the F connector 2 for interrupting a direct current leading therebetween.

The impedance-matching circuit 30, all the clips 32, 33, 34, 35 and the grounding anvil member 36 are mounted on the substrate plate 31 by dip soldering.

Figure 5:
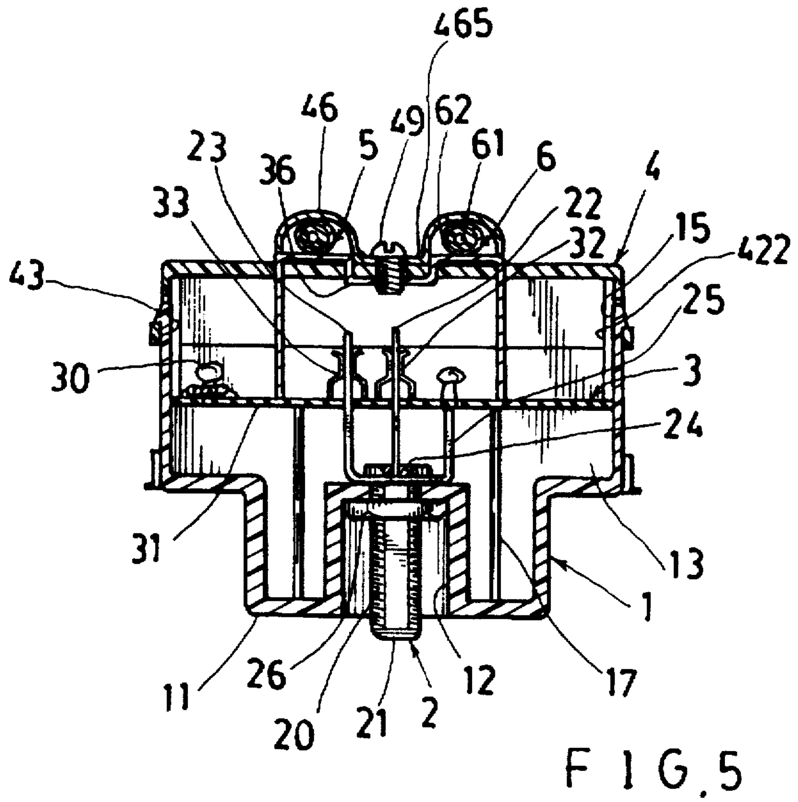
FIG. 5 is a sectional drawing showing a connection among the input terminal, output terminal and the F-connector secured in the splitter of the present invention.
Figure 6:
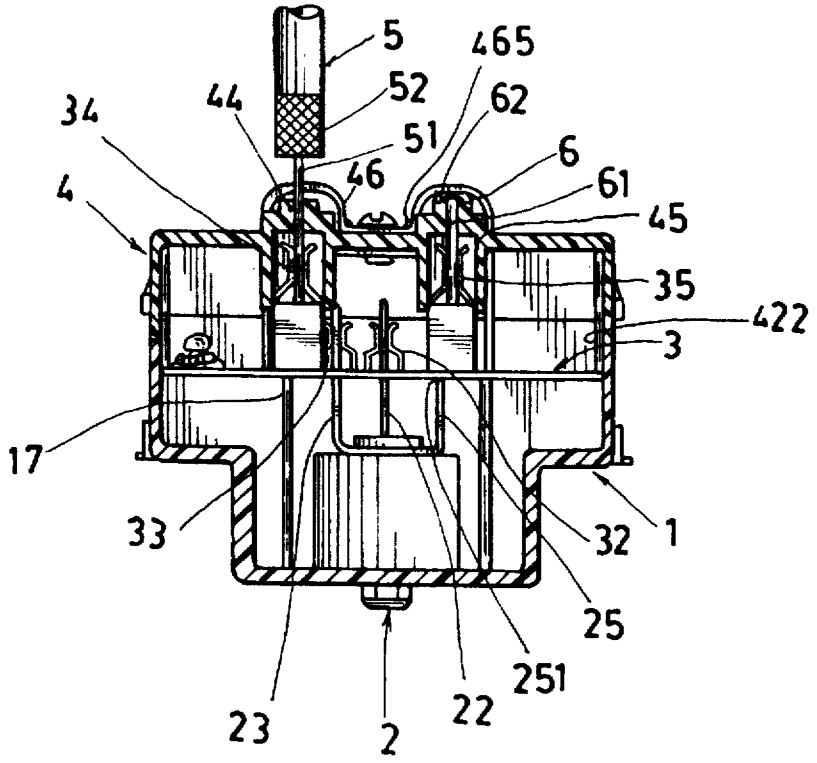
FIG. 6 is a sectional drawing showing a grounding operation for the terminals of the present invention.
Figure 7:
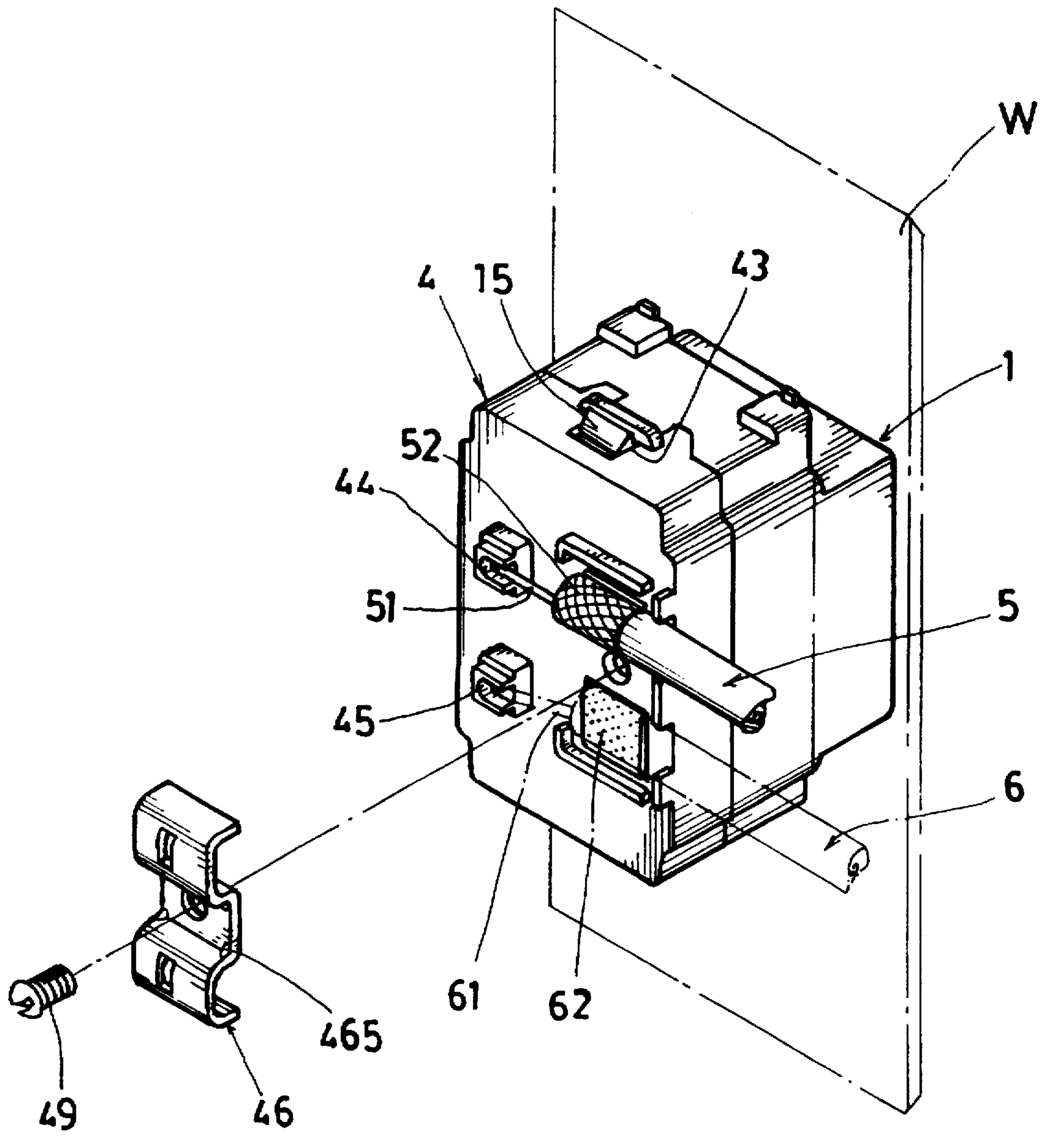
FIG. 7 is a rear perspective view of the present invention.

The grounding clamp member 46 is generally M shaped and made of electrically conductive material, including: a central plate portion 461 having an outer screw hole 462 formed therein for securing a screw 49 into the grounding anvil member 36 of the electrical circuit board 3 and recessedly connected between a first clamp portion 463 and a second clamp portion 464 cooperatively clamping two grounding layers 52, 62 of an input and an output terminals 5, 6 on the two convex base portions 361, 362 of the grounding anvil member 36 for electrical grounding use as shown in FIGS. 5–7.

A circuit (or path) of the central conductance between the input terminal 5 and output terminal 6 and F connector 2 is described in detail as follows:

The central conductor 51 of input terminal 5 is electrically connected to the input conductor clip 34 on the circuit board 3 through the input socket 44 on the cover 4, the input conductor clip 34 of the circuit board 3 is then connected to the central conductor 61 of the output terminal 6 through the matching circuit 30 on the board 3 through the output socket 45, while the input conductor clip 34 is electrically connected to the central conductor clip 32 through circuit 30 on the board 3 which is then connected to the central conductor pin 22 of F connector 2 for an output connection through socket 21 of the F connector 2.

The present invention can be assembled immediately by engaging the latch members 15 on the housing 1 with the latch holes 43 in the cover 4 for combining the cover 4 with the housing 1 by holding the electrical circuit board 3 in the housing 1 and the cover 4 for quick assembly of TV jack at decreased production cost, thereby being superior to a conventional TV splitter.

Even the present invention as aforementioned discloses a two-way splitter for one input and two outputs (out 1 and out 2), several splitters may however be juxtapositionally built in a wall for TV antenna signal connection.

The grounding clamp member 46 may be formed with four protrusions 465 each protrusion 465 positioned at a connection portion between the central plate portion 461 and either clamp portion 463 or 464; two clamp portions 463,464 being retained on two retainer extensions 471, 481 formed on the two grounding openings 47, 48. Therefore, after fixing the screw 49 for clamping the grounding layers 52, 62 by the clamp member 46, the clamp member 46 will be stably fixed on the anvil member 36 without being deformed.

The housing 1 may be formed with four front positioning stems 17 protruding inwardly from the front panel 11, while the rear cover 4 may be formed with four rear positioning stems 422 protruding frontwardly from the cover plate 41, thereby cooperatively retaining the substrate plate 31 of the circuit board 3 sandwiched between the front and rear positioning stems 17, 422.

I claim:

1. A cassette splitter for television antenna signals comprising:

a housing (1) having a F connector (2) secured in a front portion of the housing and having a first engaging means formed on a first side wall of said housing:

an electrical circuit board (3) having an impedance matching circuit (30) and mounted in the housing; and a rear cover (4) having a second engaging means formed on a side wall of the rear cover to be engaged with the first engaging means of said housing for a quick combination of said housing (1) and said rear cover (4), said rear cover (4) having an input terminal (5) electrically connected to a television antenna to lead said TV antenna signals inwardly through said impedance matching circuit (30) to be split into said F connector which is connected to an interior TV set and split into an output terminal (6) mounted on the rear cover (4) which is transmitted outwardly through said output terminal (6) secured on said rear cover (4).

2. A cassette splitter according to claim 1 wherein said housing (1) includes: a front panel (11) having a front cavity (12) recessed rearwardly in the front panel (11) for mounting the F connector (2) in the front cavity (12), a rear socket (13) recessed in a rear portion of the housing (1) for mounting the electrical circuit board (3) in the rear socket (13) of the housing (1), and a pair of latch members (15) disposed on two opposite side walls (14) of the housing (1) with each said latch member (15) formed with a ratchet tooth (151) on a rear end portion of the latch member (15) having a pair of recesses (16) disposed on two opposite side portions of each said latch member (15) and recessed in each of said side walls (14).

3. A cassette splitter according to claim 2, wherein said F connector (2) includes: a female socket (21) formed in a front central portion of a threaded stem (20) of the F connector (2) for engaging a male F connector for transmitting said television antenna signals from said television antenna to said interior television set, a central conductor pin (22) protruding rearwardly from the threaded stem (20) and electrically connected with the female socket (21) through a central pin slot (311) formed through a substrate plate (31) of the electrical circuit board (3) mounted in the rear socket (13) of the housing (1), a grounding pin (23) protruding rearwardly from the threaded stem (20) juxtapositional to the central conductor pin (22) and electrically insulative from the central conductor pin (22) by an insulative medium (24) embedded in a central portion of the F connector (2), a positioning pin (25) secured with the grounding pin (23) and having a rear end portion (251) protruding rearwardly from the threaded stem (20) for retaining the substrate plate (31) of the electrical circuit board (3), and a nut (26) locking the threaded stem (20) of the F connector (2) in the front cavity (12) of the housing (1).

4. A cassette splitter according to claim 3, wherein said electrical circuit board (3) includes: said impedance matching circuit (30) fixed on the substrate plate (31) secured in the housing (1), a central conductor clip (32) secured on a central portion of the substrate plate (31) aligned with a first pin slot (311) for clamping the central conductor pin (22) of the F connector (2), a grounding pin clip (33) secured on the substrate plate (31) juxtapositional to the central conductor clip (32) for clamping the grounding pin (23) of the F connector (2) with the grounding pin (23) passing through a second pin slot (312) formed through the substrate plate (31), an input conductor clip (34) and an output conductor clip (35) respectively secured on the substrate plate (31) adjacent to the central conductor clip (32) and the grounding pin clip (33), and a grounding anvil member (36) secured on the substrate plate (31) and made of electrically conductive metal to be grounded in cooperation with a grounding clamp member (46) of said rear cover (4) combinably secured with the housing (1) for sealing the electrical circuit board (3) in the housing (1) and the rear cover (4).

5. A cassette splitter according to claim 4, wherein said grounding anvil member (36) is generally M shaped and includes: a first convex base portion (361) secured to the substrate plate (31) electrically connected with the grounding pin clip (33), a second convex base portion (362) secured to the substrate plate (31) and connected to the first base portion (361) by a central bridge portion (363) of said anvil member (36) having an inner screw hole (364) formed in the bridge portion (363) to be engaged with a screw (49) passing through an outer screw hole (462) formed in the grounding clamp member (46) secured to the rear cover (4) for an electrically grounding purpose.

6. A cassette splitter according to claim 5, wherein said rear cover (4) includes: a cover plate (41) having two opposite side walls (42) perpendicularly connected to the cover plate (41), each said side wall (42) provided with a latch hole (43) engageable with said ratchet tooth (151) of said latch member (15) formed on each said side wall (14) of the housing (1) for combining the rear cover (4) with the housing (1), an input terminal socket (44) and an output terminal socket (45) respectively formed through the rear cover (4) for respectively connecting an input terminal (5) and an output terminal (6) for transmitting said television antenna signals inwardly and outwardly through said input and output terminals (5 and 6), and a first and a second grounding opening (47, 48) respectively formed through the cover plate (41) of the rear cover (4) for respectively protruding the first and the second convex base portions (361, 362) of the grounding anvil member (36) rearwardly through the two grounding openings (47, 48) for clamping two grounding layers (52, 62) of the input and the output terminals (5, 6) for grounding use as clamped by a grounding clamp member (46), each said input and output terminals (51, 61) having a central conductor (51 or 61) and secured with a coaxial cable, said two central conductors (51, 61) respectively inserted in the input and the output terminal sockets (44, 45) in the rear cover (4) to allow the input terminal (5) to be electrically connected with the F connector (2) and connected with the output terminal (6) through said impedance matching circuit (30).

7. A cassette splitter according to claim 6, wherein each of said cover plate side walls (42) is formed with two protrusions (421) on said cover plate side walls (45) to be engaged with said two recesses (16) formed in each said side walls (14) of the housing (1) for combining the rear cover (4) with the housing (1).

8. A cassette splitter according to claim 6, wherein said impedance matching circuit (30) includes: a balancing coil (L1) connected between the input terminal (5) and the output terminal (6) and the F connector (2), a matching capacitor (C1) and a matching resistor (R1) parallelly connected between the input terminal (5) and the F connector (2) for obtaining a desired matching impedance of said television antenna signals.

9. A cassette splitter according to claim 6, wherein said grounding clamp member (46) is generally M shaped and is made of electrically conductive material, including: a central plate portion (461) having an outer screw hole (462) formed therein for securing a screw (49) into the grounding anvil member (36) of the electrical circuit board (3) and connected between a first clamp portion (463) and a second clamp portion (464) cooperatively clamping two grounding layers 152, 62) of said input and output terminals (5, 6) on the two convex base portions (361, 362) of the grounding anvil member (36) for electrical grounding use.

10. A cassette splitter according to claim 6, wherein said input terminal (5) has said central conductor (51) electrically connected to an input conductor clip (34) on the electrical circuit board (3) through the input socket (44) on the rear cover (4), the input conductor clip (34) of the electrical circuit board (3) is electrically connected to the central conductor (61) of the output terminal (6) through the impedance matching circuit (30) on the electrical circuit board (3) through the output socket (45); said input conductor clip (34) electrically connected to a central conductor clip (32) through the impedance matching circuit (30) on the electrical circuit board (3) which is connected to the central conductor pin (22) of said F connector (2) for an output connection through the female socket (21) in the F connector (2).

11. A cassette splitter according to claim 9, wherein said grounding clamp member (46) is formed with a plurality of protrusions (465) each of said protrusions (465) positioned at a connection portion between the central plate portion (461) and each of said first or second clamp portions (463 or 464); said first and second clamp portions (463, 464) retained on two retainer extensions (471, 481) disposed around said two grounding openings (47, 48) in the rear cover (4).

* * * * *